United States Patent Office 3,672,824
Patented June 27, 1972

3,672,824
METHOD FOR OXIDIZING CARBON MONOXIDE CONTAINED IN ROOM AIR
Takaaki Tamura, Tokyo, and Tsutomu Kato, Hamamatsu-shi, Japan, assignors to Kachita Co., Ltd., Shizuoka-ken, Japan
Filed June 16, 1969, Ser. No. 833,285
Claims priority, application Japan, June 20, 1968, 43/42,374; Oct. 16, 1968, 43/74,952
Int. Cl. B01d 53/34
U.S. Cl. 23—4
7 Claims

ABSTRACT OF THE DISCLOSURE

Where carbon monoxide contained with moisture in room air is converted to harmless carbon dioxide using an oxidation catalyst mixed with natural zeolite, it has been discovered that if there is provided, before and after the catalyst chamber, demoistening chambers filled with a desiccant such as active alumina or natural zeolite, and said gas is allowed to pass through these three chambers first to one direction and thereafter in the opposite direction, continuously repeating said gas passage operation by turns, then the aforementioned catalyst will be possible to display an effect of efficiently eliminating carbon monoxide over a long period without reducing its catalytic action.

BACKGROUND OF THE INVENTION

This invention relates to an improved method for allowing for an efficient operation of converting carbon monoxide contained in room air to harmless carbon dioxide using an oxidation catalyst.

One of the present inventors previously invented, as published in U.S. Pats. Nos. 3,436,356 and 3,498,928 with the other co-inventor, novel types of catalyst prepared by incorporating manganese oxide and copper oxide in natural zeolite mainly with the view of converting by oxidation the carbon monoxide contained in exhaust gas from an automobile engine to harmless carbon dioxide. These catalysts are not only adapted for treatment of said exhaust, but also display a catalytic action to oxidize carbon monoxide at normal temperature. Accordingly they are effectively applicable in purifying the air of a room where there is fired an oil stove or the air in the interior seating space of an automobile.

However, our experiments showed that, in the air having a relative humidity of 70 percent and over, the natural zeolite added to the aforesaid catalyst materials adsorbed moisture, and that when the zeolite was saturated with adsorbed moisture it caused the useful life of the catalyst to be rapidly reduced. It was also disclosed that in case the air had a relative humidity of less than 70 percent, the lower said humidity, the more prolonged the catalyst life.

For continuous elimination, therefore, of carbon monoxide contained in wet air, it may be deemed sufficient to dispose a chamber packed with suitable desiccant particles ahead of the catalyst chamber, and introduce the air through the catalyst after being dried by passage through said desiccant. But the moisture adsorbing life of a desiccant is far shorter than the active life of a catalyst having the same weight, so that, unless a saturated desiccant is often replaced, it will be impossible to use the catalyst effectively over a long period. Moreover, such replacement of the desiccant is not only uneconomical but also troublesome and time-consuming.

SUMMARY OF THE INVENTION

It is an object of the present invention to enlarge the activity and life of the oxidation catalyst by preventing the aforeseaid too early deterioration of desiccant and save the trouble of frequently replacing of the desiccant.

This object may be attained by the method of the present invention which comprises providing, before and after a catalytic chamber packed with particles of a catalyst mixed with natural zeolite respectively demoistening chambers packed with particles of a desiccant capable of allowing moisture adsorbed thereto to be desorbed upon exposure to streams of a dried gas, passing air containing carbon monoxide, moisture and oxygen through said three chambers first in one direction for a certain length of time and then in the opposite direction for the same period, and repeating said gas passage operation by turns.

DETAILED DESCRIPTION OF THE INVENTION

Figure 1:
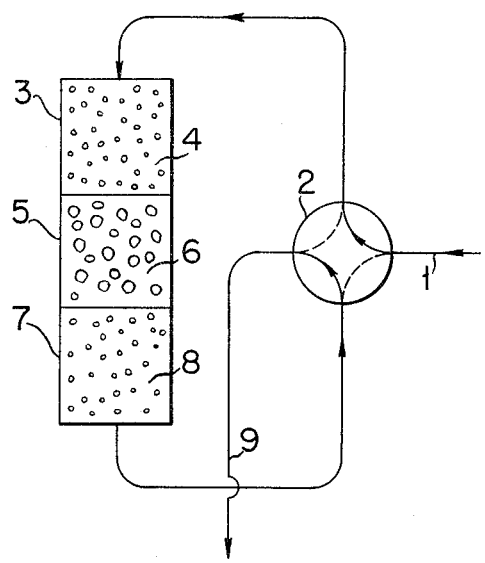
FIG. 1 is diagrammatic illustration showing the process of the invented method.

There will now be described the method of the present invention wtih reference to FIG. 1.

Air at normal temperature containing carbon monoxide and having a relative humidity of about 70 percent is introduced through an inlet pipe 1 and allowed to proceed in the direction of solid line arrows through a four way valve 2. Thereafter the air travels through a first demoistener 3 packed with particles of a desiccant 4 capable of being regenerated upon exposure to streams of a dried gas, an oxidation chamber 5 packed with particles of an oxidation catalyst 6 mixed with natural zeolite, and a second demoistener 7 packed with the same kind of desiccant 8 in the order mentioned. Thereafter the air is carried in the direction of the indicated arrow back to the four way valve 2, from which the air is discharged through an outlet pipe 9 in the direction of a solid line.

According to this process, the moisture contained in the air is adsorbed to the first desiccant 4, so that, while the air thus dried passes through the catalyst 6, the carbon monoxide present therein is unfailingly oxidized to carbon dioxide. When the dried air containing said carbon dioxide travels through the second desiccant 8, it desorbs the moisture adsorbed to said desiccant 8. When the first desiccant 4 is saturated with adsorbed moisture, it can no longer adsorb any more moisture present in the introduced air, so that the activity of the catalyst 6 is weakened by such unadsorbed moisture. To prevent the occurrence of such event, the air is allowed to pass, prior to the full saturation of the first desiccant 4 with moisture, in the opposite direction to the previous course as indicated by the dotted lines by switching the operation of the four way valve 2, namely, through the second demoistener 7, oxidation chamber 5 and first demoistener 3 in turn, and thereafter released out of the catalyst system through the outlet pipe 9. The air entering the catalyst 6 from the second demoistener 7 is already dried during its passage through the second desiccant 8, so that when the dried air passes through the first desiccant 4 after the oxidation of CO to $CO_2$ by the catalyst 6, it desorbs the moisture adsorbed to said first desiccant 4.

Before the second desiccant 8 is fully saturated with adsorbed moisture, the air passage is again reversed, and repetition of such reversion permits the catalyst 6 to be always kept dry and preserve its useful life over a long period.

Desiccants capable of regeneration include silica gel, active alumina and zeolite. All these desiccants enable the moisture adsorbed thereto to be easily desorbed when exposed to streams of dry air. Particularly the silica gel impregnated with cobalt ion presents a blue color while it is not fully saturated with moisture, but when completely saturated, displays a faint pink color. This offers great convenience in distinguishing the time required for the air streams through the desiccant to be reversed.

Figure 2:
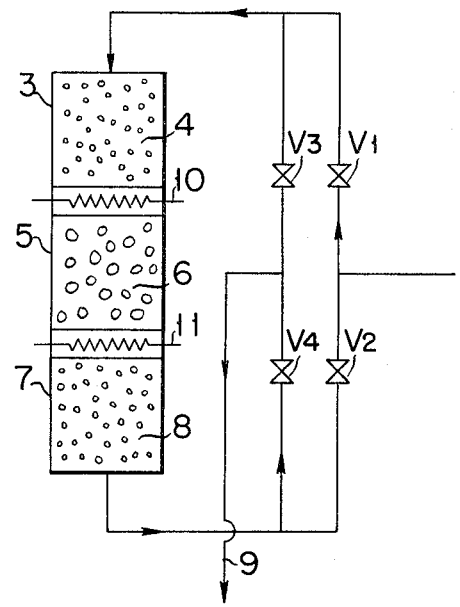
FIG. 2 is another diagrammatic illustration showing the same.

The oxidation of carbon monoxide to carbon dioxide is an exothermic reaction, so that the air containing a certain amount of carbon monoxide slightly rises in temperature when it flows through the catalyst chamber. When this hot air enters the succeeding demoistener, the desiccant packed therein is heated thereby helping the moisture adsorbed thereto to be more easily desorbed.

Where the air to be introduced is supposed to contain small amounts of carbon monoxide, it may be advisable to dispose heating means 10 and 11, in FIG. 2, such as an electric heater between the first demoistener 3 and the catalyst chamber 5 as well as between said catalyst chamber 5 and the second demoistener 7, so as to positively assist the heating of the catalyst 6 from the outside. Conversely where the air to be treated is found to contain considerable volumes of carbon monoxide, it will be possible to prevent the overheating of the catalyst 6 by providing a cooling means such as a cooling water pipe instead of the heating means 10 and 11.

The apparatus depicted on FIG. 2 involves four switch valves $V_1$, $V_2$, $V_3$ and $V_4$ in place of the four way valve 2 of FIG. 1. When the valves $V_1$ and $V_4$ are opened and the other valves $V_2$ and $V_3$ are closed, the air introduced through an inlet pipe 1 flows in the direction of the indicated arrows and is discharged out of the catalyst system through an outlet pipe 9. Conversely, when the valves $V_1$ and $V_4$ are closed and the other valves $V_2$ and $V_3$ are opened, the air travels through the demoisteners and catalyst chamber in the opposite direction to the previous case, and is released from the system similarly through the outlet pipe 9.

Figure 3:
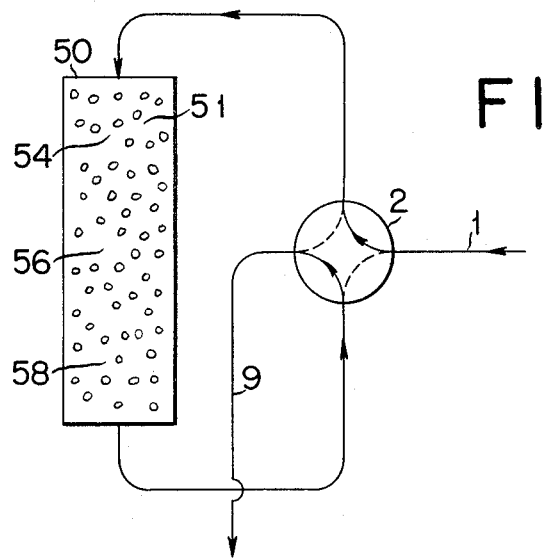
FIG. 3 is a further diagrammatic illustration showing the same.

Another modification of the present invention is shown in FIG. 3. According to this modification, the first demoistener 3, catalyst chamber 5 and second demoistener 7 of FIG. 1 are integrally assembled to form the entire system simply into a catalyst chamber 50 packed with particles of the oxidation catalyst, the amount of said catalyst being about three times what is usually required for such purpose. As previously described, this oxidation catalyst is mixed with natural zeolite, so that it can adsorb or desorb moisture by itself. Accordingly, when the air containing moisture and carbon monoxide is introduced through the catalyst chamber 50 in the direction of the indicated arrows, the upper and lower portions 54 and 58 of the catalyst 51 respectively perform an action corresponding to that of the first and second desiccants 4 and 8 of FIG. 1, and the middle portion 56 of the catalyst 51 carries out the main catalytic action. In the modification depicted on FIG. 3, not only the arrangement of the entire apparatus is simplified, but also the portions 54 and 58 of the catalyst 51 adsorb and desorb moisture as a desiccant and additionally perform some catalytic action, so that the catalyst 51 has an elevated activity and prolonged life as a whole.

In accordance with the provisions of the patent statutes, we have explained the principle and operation of our invention, and have illustrated and described what we consider to represent the representative embodiments thereof. However, we desire to have it understood that within the scope of the appended claims the invention may be practised otherwise than as specifically illustrated and described.

EXAMPLE 1

There were closely juxtaposed lengthwise as shown in FIG. 1 three cylinders 5 cm. in diameter and 10 cm. high provided with a gas transmissible partition. The central cylinder was packed with a catalyst prepared by incorporating manganese oxide and copper oxide in fine powders of natural zeolite and thereafter pelletizing the mixture, and the top and bottom cylinders were filled with a desiccant of siilca gel. Through these three cylinders there was introduced first in one direction at the rate of 15 l. per minute air containing 0.1 percent carbon monoxide and saturated with moisture at a temperature of 20° C., and thereafter the flow of air streams was reversed every 10 minutes. The content of carbon monoxide in the discharged air was reduced to 0.002 percent. Though the catalyst was continuously operated 1000 hours from the start to treat the aforementioned air, the value of 0.002 remained unchanged. The temperature of the catalyst was maintained at about 100° C. by its reaction heat.

By way of comparison, there was introduced the aforementioned air continuously only in one direction through a single catalyst cylinder without providing demoisteners. While the content of carbon monoxide in the discharged air could be reduced to 0.002 percent until 30 minutes from the start, it returned to 0.1 percent in an hour, disclosing that the catalyst had entirely lost its activity.

EXAMPLE 2

A cylinder 5 cm. in diameter and 30 cm. long was filled with the same catalyst particles as used in Example 1. Through this catalyst chamber there was conducted the same kind of air as in Example 1 at the rate of 15 l. per minute, reversing the direction of its flow every 10 minutes. Over a period of more than 1000 hours of continuous operation, the content of carbon monoxide in the discharged air was constantly kept at 0.001 percent. The temperature of the catalyst was maintained at about 100° C. by its reaction heat.

By way of comparison, the air was carried through the catalyst chamber only in one direction. In this case, the content of carbon monoxide was decreased to 0.001 percent until 30 minutes from the start, whereas two hours later, said content was brought back to 0.1 percent, showing that the catalyst had become quite inactive.

What we claim is:

1. A method for removing carbon monoxide from moisture-containing room air by oxidation of said carbon monoxide using an admixture of a carbon monoxide oxidation catalyst and natural zeolite, disposing before and after a chamber packed with particles of said admixture two demoistening chambers packed with particles of a desiccant capable of allowing moisture absorbed thereto to be easily desorbed when exposed to streams of dry gas, oxidizing said carbon monoxide by passing said air containing carbon monoxide, moisture and oxygen sequentially through these three juxtaposed chambers first in one direction for a length of time up to the time required for said desiccant material in said demoistening chamber to become substantially saturated with moisture, then passing said air in the opposite direction through said three juxtaposed chambers for a similar length of time and continuously and sequentially repeating said air passage operations whereby said admixture is maintained at a high level of catalytic activity.

2. The method of claim 1 wherein the desiccant is selected from the group consisting of silica gel, active alumina and natural zeolite.

3. The method of claim 1 wherein the operating temperature of the catalyst is controlled by heating means positioned between the catalyst chamber and the demoistening chambers.

4. The method of claim 1 wherein the operating temperature of the catalyst is controlled by cooling means disposed between the catalyst chamber and the demoistening chambers.

5. A method for removing carbon monoxide from moisture-containing room air by oxidation of said carbon monoxide using an admixture of a carbon monoxide oxidation catalyst and natural zeolite which comprises providing a single catalyst chamber packed with said admixture in amounts equal to about three times what is required to oxidize said carbon monoxide during unidirectional flow of gas through the catalyst chamber, and oxidizing said carbon monoxide by passing said air containing carbon monoxide, moisture and oxygen through said chamber first in one direction for a specified length of time up to the time required for substantially the first one-third of said admixture to become substantially saturated with moisture, then passing said air in the opposite direction through said chamber for a similar length of time and continuously and sequentially repeating these air passage operations whereby said admixture is maintained at a high level of catalytic activity.

6. The method of claim 5 wherein said admixture is an admixture of manganese oxide, copper oxide, and natural zeolite.

7. The method of claim 2 wherein said admixture is an admixture of manganese oxide, copper oxide, and natural zeolite.

References Cited

UNITED STATES PATENTS

| | | | |
|---|---|---|---|
| 1,798,733 | 3/1931 | Hasche | 23—25 |
| 3,159,450 | 12/1964 | Asker et al. | 23—25 |
| 3,436,356 | 4/1969 | Kato | 23—25 |
| 3,498,928 | 3/1970 | Cho et al. | 23—25 |
| 2,946,651 | 7/1960 | Houdry | 23—25 |
| 3,211,534 | 10/1965 | Ridgway | 23—25 |

EARL C. THOMAS, Primary Examiner

U.S. Cl. X.R.

23—25, 288